United States Patent [19]

Leung et al.

[11] Patent Number: 6,009,509

[45] Date of Patent: *Dec. 28, 1999

[54] METHOD AND SYSTEM FOR THE TEMPORARY DESIGNATION AND UTILIZATION OF A PLURALITY OF PHYSICAL REGISTERS AS A STACK

[75] Inventors: Wan Lin Leung, Raleigh; Thomas Basilio Genduso, Apex, both of N.C.

[73] Assignee: International Business Machines Corporation, Armonk, N.Y.

[ * ] Notice: This patent is subject to a terminal disclaimer.

[21] Appl. No.: 08/946,840

[22] Filed: Oct. 8, 1997

[51] Int. Cl.$^6$ ........................................................ G06F 7/00

[52] U.S. Cl. .......................... 712/202; 712/23; 712/200; 712/215; 712/216; 712/217; 712/222

[58] Field of Search ...................................... 395/393, 376, 395/392, 563; 712/200, 202, 215, 216, 217, 222

[56] References Cited

U.S. PATENT DOCUMENTS

| | | | |
|---|---|---|---|
| 5,499,352 | 3/1996 | Clift et al. ................................ | 395/393 |
| 5,519,841 | 5/1996 | Sager et al. ............................... | 711/202 |
| 5,675,759 | 10/1997 | Shebanow et al. ...................... | 395/393 |
| 5,852,726 | 12/1998 | Lin et al. ................................. | 395/376 |

*Primary Examiner*—Larry D. Donaghue
*Assistant Examiner*—Nabil El-Hady
*Attorney, Agent, or Firm*—Lisa B. Yociss; Andrew J. Dillon

[57] ABSTRACT

A method and system in a superscalar data processing system are disclosed for the temporary designation and utilization of a plurality of physical registers as a stack. For each of the multiple instructions to be processed during a single clock cycle by the data processing system, a determination is made whether each of the instructions is a particular type of instruction. If a determination is made that an instruction is a particular type of instruction, a quantity of physical registers to be temporarily designated as a stack is determined utilizing the instruction. A second plurality of physical registers available to be utilized as a stack are determined whether the second plurality of the quantity. The second plurality of physical registers are then temporarily designated and utilized as a stack.

14 Claims, 8 Drawing Sheets

Fig. 2

| OP Code | Logical Code Register | Logical Stack Reg. or Base Reg. | Displ. | Virtual Stack Flag | Stack Register Number | Physical Register ID | Built Storage Address |
|---|---|---|---|---|---|---|---|
| 46 | 48 | 50 | 52 | 54 | 56 | 58 | 60 |

| OP Code | Base 1 or Logical Stack Register | Displ. 1 | Base 2 or Logical Stack Register | Displ. 2 | Virtual Stack Flag | Stack Register Number | Physical Register ID | Built Storage Address 1 or 2 |
|---|---|---|---|---|---|---|---|---|
| 64 | 66 | 68 | 70 | 72 | 74 | 76 | 78 | 80 |

{62}

METHOD AND SYSTEM FOR THE TEMPORARY DESIGNATION AND UTILIZATION OF A PLURALITY OF PHYSICAL REGISTERS AS A STACK

CROSS-REFERENCE TO RELATED APPLICATIONS

The present invention is related to the subject matter of copending patent application Ser. No. 08/886,657 assigned to the assignee herein named filed on Jul. 1, 1997 and incorporated herein by reference.

BACKGROUND OF THE INVENTION

1. Technical Field

The present invention relates to data processing systems, and in particular to the temporary designation and utilization of a plurality of physical registers as a stack in a superscalar data processing system. Still more particularly, the present invention relates to a method and system in a superscalar data processing system for the determination of a quantity of physical registers to be temporarily designated as a stack and the temporary designation of the physical registers as the stack.

2. Description of the Related Art

A superscalar data processing system is a data processing system which includes a microprocessor architecture which is capable of executing multiple instructions per clock cycle. In order to execute multiple instructions per clock cycle, multiple independent functional units that can execute concurrently are required. Instructions are first fetched and then decoded. The overlap of the fetching and decoding of one instruction with the execution of a second instruction is called pipelining. In pipelined superscalar data processing systems, care must be taken to avoid dependencies where multiple instructions are fetched, decoded, and executed in a single cycle.

Some microprocessor architectures utilize a "stack" during the processing of instructions. A stack is a designated dynamic area of memory, either main memory or a cache, that stores temporary logical register information and return addresses of subroutines. The stack includes elements which are the multiple, contiguous storage locations into which data may be stored. The number of elements may expand or contract over time by having elements added to or removed from it. The stack is addressed by a stack pointer which is the address of the top of the stack. The top of the stack is the memory location which contains the data item most recently stored in the stack during a "PUSH" operation. Typically, a stack supports two types of operations, a PUSH and a POP. A PUSH operation adds an element to the top of the stack. A POP operation removes an element from the top of the stack.

A stack is a software programming model. When this model is mapped to hardware, it is implemented in main memory and temporarily resides in a cache. Although the programmer may treat elements in the stack as if they are registers, the elements are not actual physical registers. They are either main memory or cache locations. Therefore, accessing data stored in elements in a stack are subject to the performance problems associated with the accessing of memory.

Therefore a need exists for a method and system in a superscalar data processing system for temporarily designating and utilizing a plurality of physical registers as a stack.

SUMMARY OF THE INVENTION

It is therefore one object of the present invention to provide an improved data processing system.

It is another object of the present invention to provide a method and system for the temporary designation and utilization of a plurality of physical registers as a stack in a superscalar data processing system.

It is yet another object of the present invention to provide a method and system in a superscalar data processing system for the determination of a quantity of physical registers to be temporarily designated as a stack and the temporary designation of the physical registers as the stack.

The foregoing objects are achieved as is now described. A method and system in a superscalar data processing system are disclosed for the temporary designation and utilization of a plurality of physical registers as a stack. For each of the multiple instructions to be processed during a single clock cycle by the data processing system, a determination is made whether each of the instructions is a particular type of instruction. If a determination is made that an instruction is a particular type of instruction, a quantity of physical registers to be temporarily designated as a stack is determined utilizing the instruction. A second plurality of physical registers available to be utilized as a stack are determined whether the second plurality of the quantity. The second plurality of physical registers are then temporarily designated and utilized as a stack.

The above as well as additional objectives, features, and advantages of the illustrative embodiment will become apparent in the following detailed written description.

BRIEF DESCRIPTION OF THE DRAWINGS

The novel features are set forth in the appended claims. The present invention itself, however, as well as a preferred mode of use, further objectives and advantages thereof, will best be understood by reference to the following detailed description of the preferred embodiment when read in conjunction with the accompanying drawings, wherein:

FIG. 2 illustrates a pictorial representation of a special instruction register and its associated fields for an instruction which moves data between a logical register and a memory location in accordance with the method and system of the present invention;

FIG. 3 depicts a pictorial representation of a special instruction register and its associated fields for an instruction which moves data between memory locations in accordance with the method and system of the present invention;

DETAILED DESCRIPTION OF PREFERRED EMBODIMENT

An exemplary embodiment of the present invention and its advantages are better understood by referring to FIGS. 1–12 of the drawings, like numerals being used for like and corresponding parts of the accompanying drawings.

Figure 1:
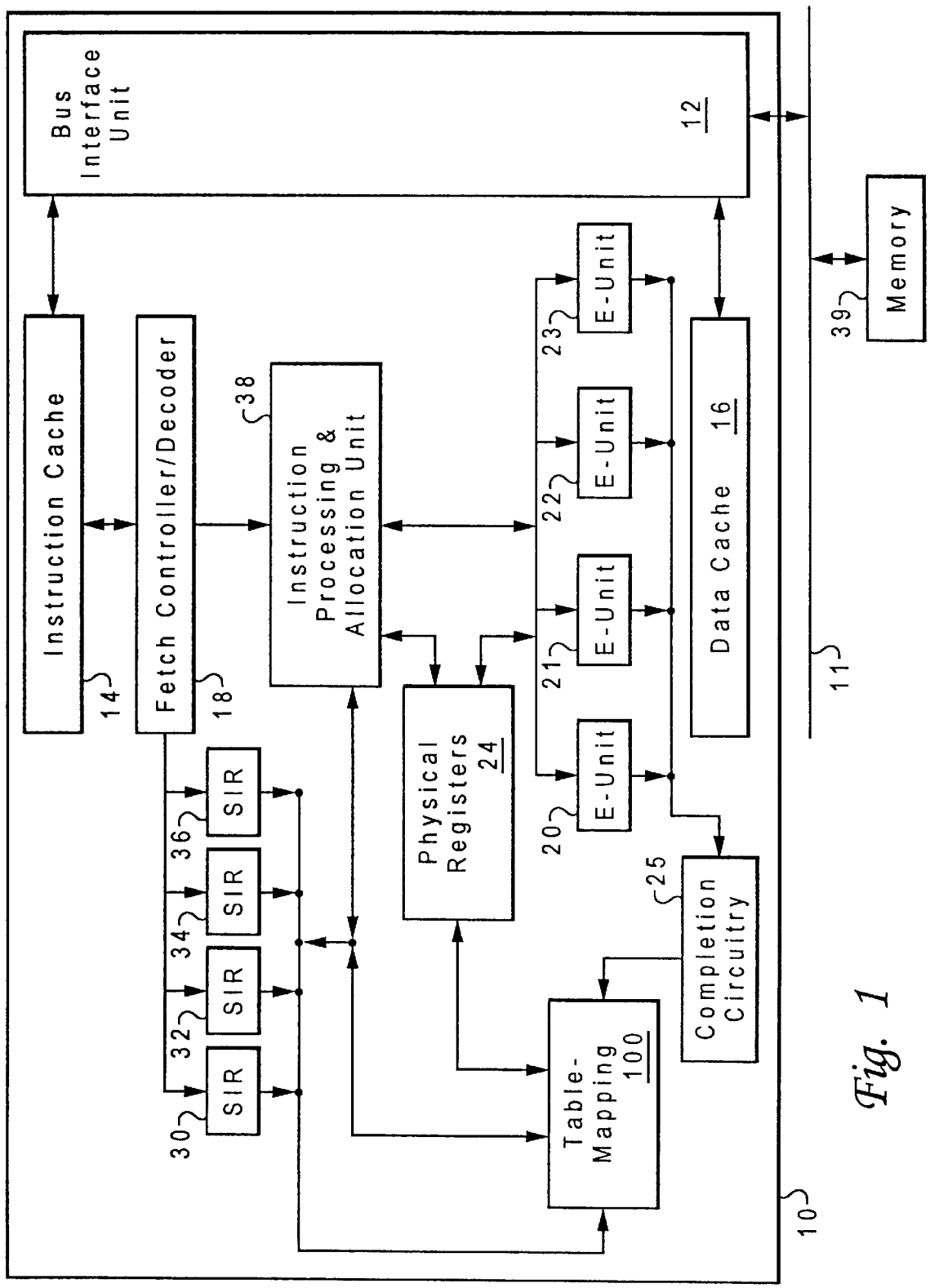
FIG. 1 depicts a high level block diagram of a superscalar data processing system 10 which may be utilized to implement the method and system of the present invention.

FIG. 1 is a block diagram of a processor 10 system for processing information according to the preferred embodiment. In the preferred embodiment, processor 10 is a single integrated circuit superscalar microprocessor. Accordingly, as discussed further herein below, processor 10 includes various units, registers, buffers, memories, and other sections, all of which are formed by integrated circuitry. Also, in the preferred embodiment, processor 10 operates according to reduced instruction set computer ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a fetch controller and decoder 18. In response to such instructions from instruction cache 14, fetch controller and decoder 18 selectively outputs instructions to other execution circuitry of processor 10.

In fetch controller and decoder 18, in the preferred embodiment the execution circuitry of processor 10 includes multiple execution units, such as execution units 20, 21, 22, and 23. Execution units 20, 21, 22, and 23 input their source operand information from a plurality of physical registers 24. According to an important feature of the present invention, none of the physical registers 24 are initially designated as a stack register.

When processor 10 is initially powered up, physical registers 24 each have an associated address. Those skilled in the art will recognize that physical registers 24 may include any number of physical registers.

In response to a Load instruction, information is input from data cache 16 and eventually copied to a selected one of physical registers 24. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, information is input from a selected one of physical registers 24 and copies such information to data cache 16.

Processor 10 achieves high performance by processing multiple instructions simultaneously at various ones of execution units 20, 21, 22, and 23. Accordingly, each instruction is processed as a sequence of stages, each being executable in parallel with stages of other instructions. Such a technique is called "pipelining". In a significant aspect of the illustrative embodiment, an instruction is normally processed in five or more stages, namely fetch, decode, dispatch, execute, and completion.

In the fetch stage, fetch controller and decoder 18 selectively inputs (from instructions cache 14) one or more instructions from one or more memory addresses and decodes up to four fetched instructions. These decoded instructions are stored in special instruction registers (SIR) 30, 32, 34, and 36.

In the dispatch stage, instruction processor and allocation unit 38 pre-processes and selectively dispatches up to four decoded instructions to selected ones of execution units 20, 21, 22, and 23. In the dispatch stage, operand information is supplied to the selected execution units for dispatched instructions. Processor 10 dispatches instructions in order of their programmed sequence.

In the execute stage, execution units 20, 21, 22, and 23 execute their dispatched instructions and output results (destination operand information) of their operations for storage at selected entries in physical registers 24. In this manner, processor 10 is able to execute instructions out-of-order relative to their programmed sequence.

In the completion stage, completion circuitry 25 is utilized so that the instructions are completed in their programmed order.

In the preferred embodiment, each instruction requires one machine cycle to complete each of the stages of instruction processing. Nevertheless, some instructions (e.g., complex fixed point instructions) may require more than one cycle. Accordingly, a variable delay may occur between a particular instruction's execution and completion stages in response to the variation in time required for completion of preceding instructions.

Superscalar data processing system 10 may concurrently process multiple instructions per clock cycle. For purposes of this specification, superscalar data processing system 10 may process up to four (4) instructions per clock cycle. Those skilled in the art will recognize that superscalar data processing system 10 may concurrently process any number of instructions per clock cycle.

In register-based computer systems such as described above, operations that utilize data stored within the registers typically complete faster than those operations which utilize data stored elsewhere within the system, such as in a cache or main memory. Therefore, to maximize the performance of software that is processed by these systems, data should be kept in the physical registers.

Much of the data that is stored in the physical registers is of a transient or temporary nature. Transient data is generated and manipulated during a set of operations but is not stored once the operations have completed processing. For example, when performing a long scientific calculation, a number of partial results may be generated and discarded once the final result is calculated. Given the ability of current computer systems to simultaneously execute multiple operations, there exists the possibility that a large amount of transient data can exist at any given time within the computer system. Therefore, many computer architectures, such as the one described above, have a very large set of physical registers.

The present invention seeks to utilize a plurality of the physical registers as a stack. In this manner, the accessing of data stored in the stack is no longer subject to the performance problems associated with the accessing of memory. Data stored in the stack is stored in physical registers which have been temporarily designated as the stack. Because the data is stored in physical registers, the accessing of the data stored in the stack is much faster than the previous systems and methods which implemented the stack in main memory or a cache.

In a preferred embodiment, the particular type of instruction is an new type of PUSH instruction. The new instruction is identified by the designation "*PUSH". The new instruction has an associated quantity of physical registers. The quantity associated with the *PUSH instruction identifies the number of physical registers to be temporarily designated as stack registers.

The second type of instruction is an instruction which has an associated logical stack register number. As described above, a plurality of physical registers are temporarily designated as a stack using the *PUSH instruction. Each of these physical registers is associated with a different logical stack register number. When a second type of instruction is processed, the physical register associated with the logical stack register number associated with this instruction is utilized.

The third type of instruction is also a new instruction. The third type of instruction is a new type of POP instruction, which is designated as "*POP". The quantity associated with the *POP identifies the number of physical registers to be released from the temporarily designation as stack registers. When the physical registers are released, or freed, they become available for other types of processing including again being temporarily designated as stack registers.

FIG. 2 illustrates a pictorial representation of a special instruction register 44 and its associated fields for an instruction which moves data between a logical register and a memory location in accordance with the method and system of the present invention. Special instruction register (SIR) 44 includes an op code field 46, logical register field 48, logical stack register or base register field 50, displacement field 52, virtual stack flag field 54, stack register number field 56, physical register identifier field 58, and a built storage address field 60.

Op code field 46 includes the op code for the particular instruction stored in special instruction register 44. Logical register field 48 includes an identification of the logical register associated with the instruction stored in SIR 44. The instruction stored in SIR 44 is an instruction which has an associated logical register, and either an associated memory location or logical stack register. Logical stack register or base register field 50 includes either a stack register or a base register associated with the instruction. Displacement field 52 includes the displacement from either the stack register or the base register to be utilized to generate a complete storage address. Virtual stack flag field 54 is utilized to store a logical "1" when field 50 includes the address of a stack register which is associated with a physical register. Stack register number field 56 includes a stack register number which is associated with the stack register stored in field 50. Physical register identifier field 58 identifies the physical register which is associated with the stack register stored in field 50. Built storage address field 60 includes the complete built address of bits 31-0 of the stack register stored in field 50 and displacement stored n field 52.

FIG. 3 depicts a pictorial representation of a special instruction register 62 and its associated fields for an instruction which moves data between memory locations in accordance with the method and system of the present invention. Special instruction register (SIR) 62 includes an op code field 64, base register 1 or logical stack register field 66, displacement 1 field 68, base register 2 or logical stack register field 70, displacement 2 field 72, virtual stack flag field 74, stack register number field 76, physical register identifier field 78, and a built storage address field 80.

Op code field 64 includes the op code for the particular instruction stored in special instruction register 62. Logical register field 66 includes an identification of the logical register associated with the instruction stored in SIR 62. The instruction stored in SIR 62 is an instruction which has associated with a memory location and a logical stack register. Logical stack register or base register field 66 includes either a stack register or a base register associated with the instruction. Displacement field 68 includes the displacement from either the stack register or the base register stored in field 66 to be utilized to generate a complete storage address. Logical stack register or base register field 70 includes either a stack register or a base register associated with the instruction. Displacement field 72 includes the displacement from either the stack register or the base register stored in field 70 to be utilized to generate a complete storage address. Virtual stack flag field 74 is utilized to store a logical "1" when either field 66 or field 70 includes the address of a stack register which is associated with a physical register. Stack register number field 76 includes a stack register number which is associated with the stack register stored in either field 66 or field 70. Physical register identifier field 78 identifies the physical register which is associated with the stack register stored in either field 66 or field 70. Built storage address field 80 includes the complete built address of bits 31-0 of the stack register stored in either field 66 or field 70 and their respective displacement fields 68 or 72.

Figure 4:
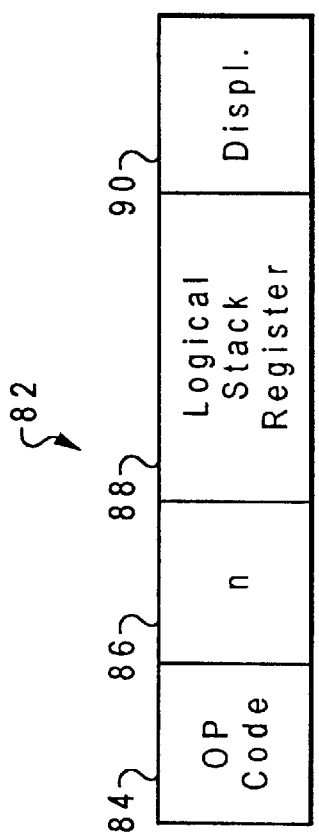
FIG. 4 illustrates a pictorial representation of an instruction format for a *PUSH or *POP instruction to be utilized in accordance with the method and system of the present invention.

FIG. 4 illustrates a pictorial representation of an instruction format 82 for a *PUSH or *POP instruction to be utilized in accordance with the method and system of the present invention. Instruction format 82 includes an op code field 84, an "n" field 86, a logical stack register field 88, and a displacement field 90. Op code field 84 includes the op code for either a *PUSH or a *POP instruction. Field 86 includes a number "n", where "n" is the number of registers to be temporarily designated as stack registers. Therefore, "n" is the number of physical registers which are to be temporarily designated as stack registers. Logical stack register field 88 includes a logical stack register. The logical stack register indicates the top of the stack and acts as a stack pointer. Displacement field 90 is utilized to generate the complete storage address of the stack register.

Figure 5:
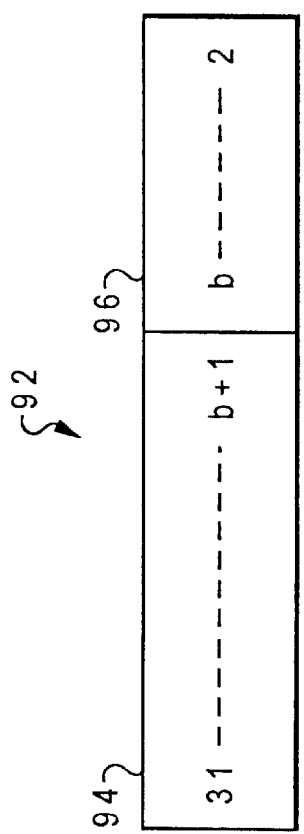
FIG. 5 depicts a pictorial representation of a logical stack register address format in accordance with the method and system of the present invention.
Figure 7:
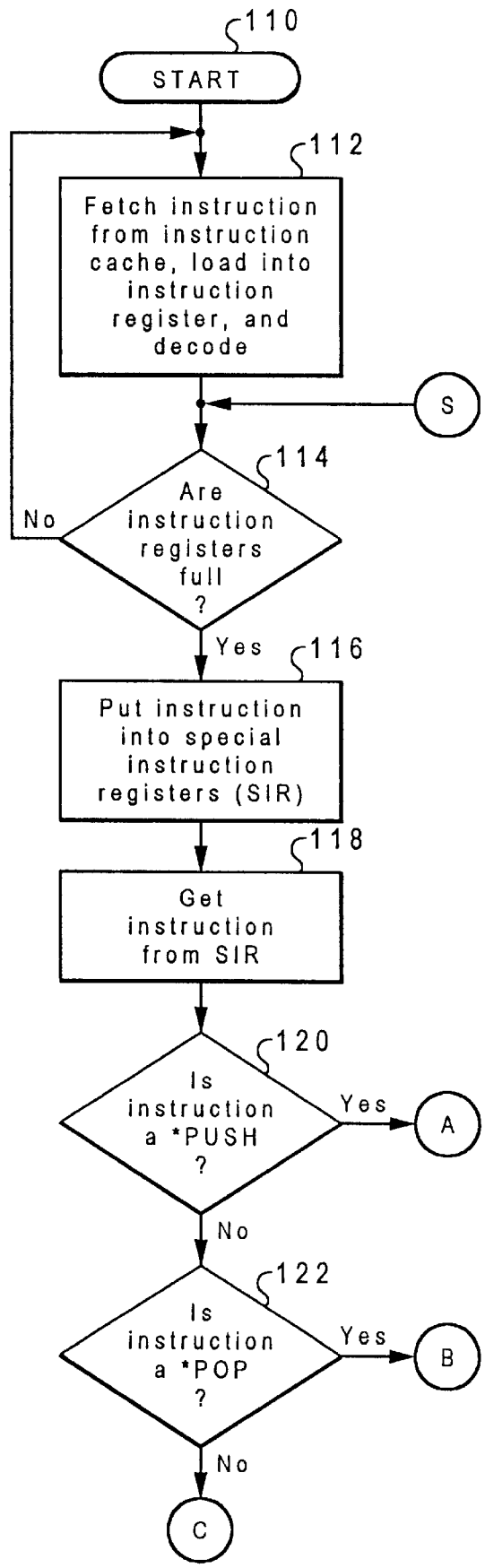
FIGS. 7–12 together depict a high level flow chart illustrating the temporary designation and utilization of a plurality of physical registers as a stack in accordance with the method and system of the present invention.
Figure 8:
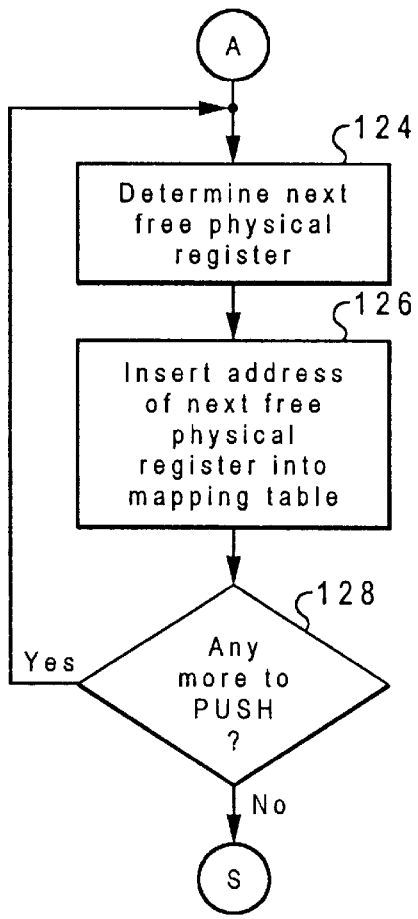
Figure 9:
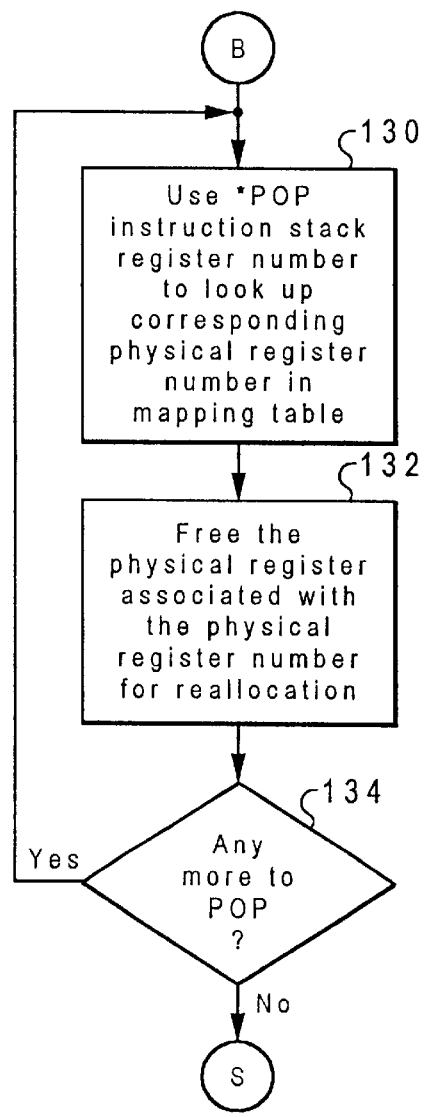
Figure 10:
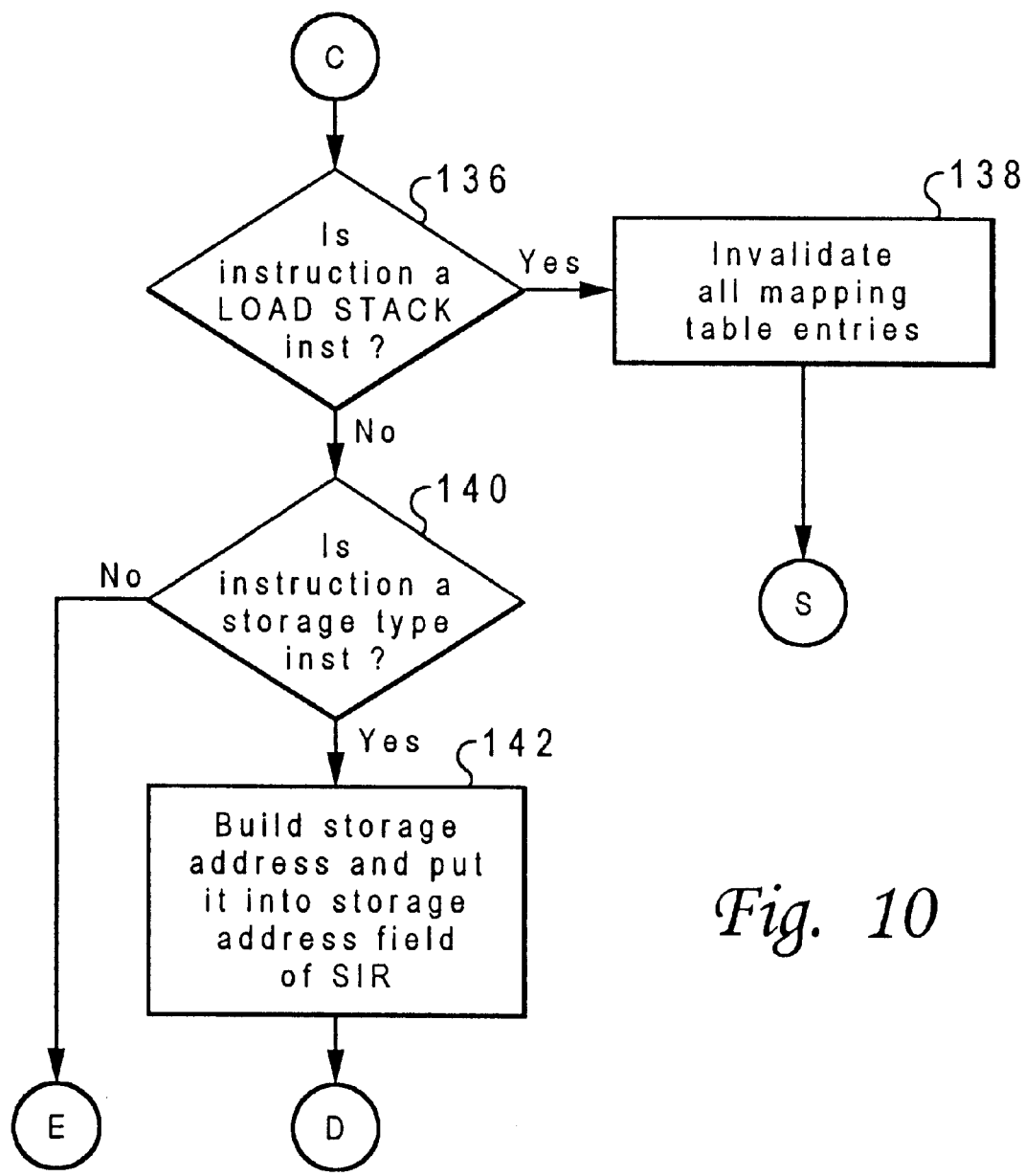
Figure 11:
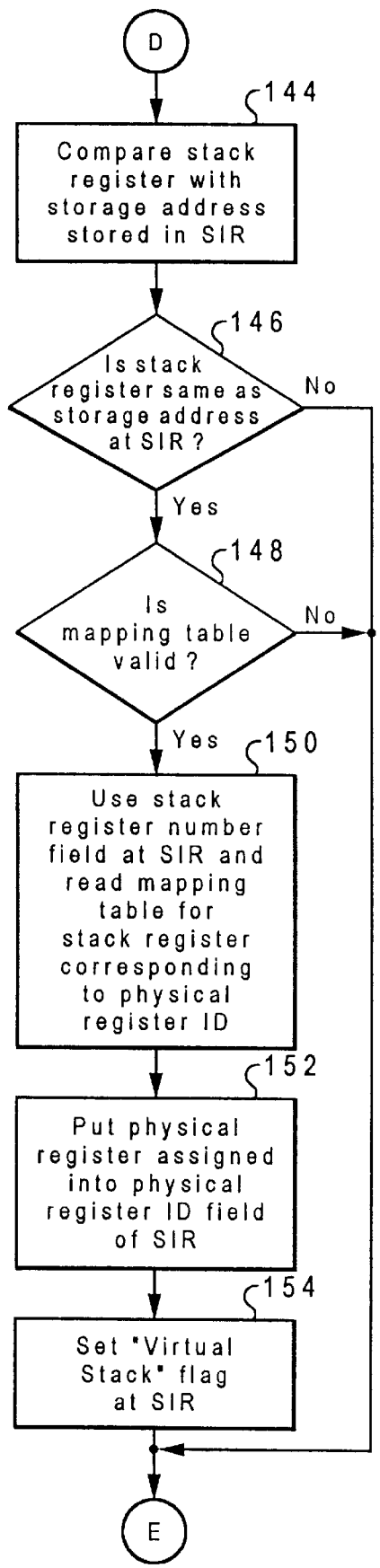
Figure 12:
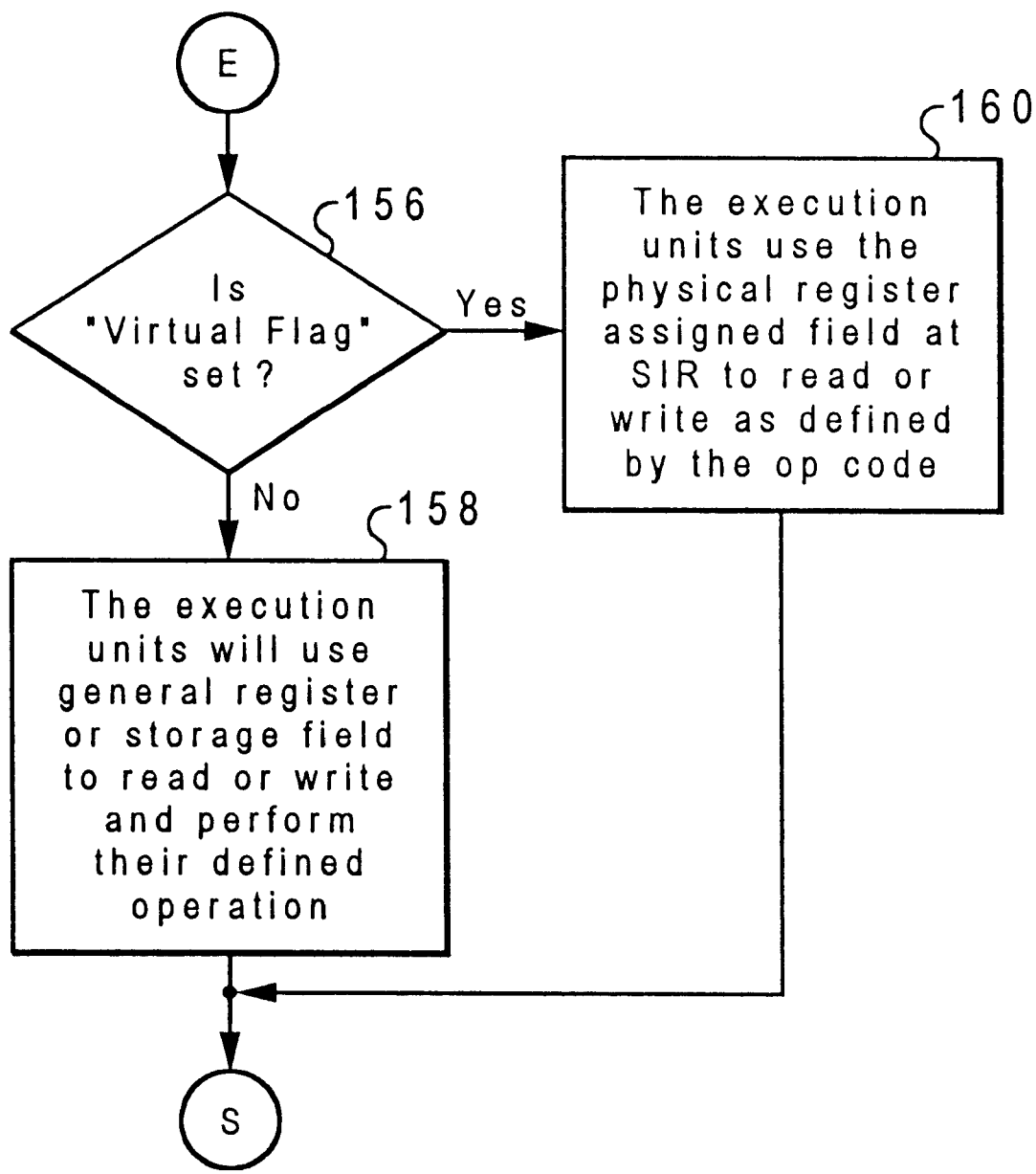

FIG. 5 depicts a pictorial representation of a logical stack register address format 92 in accordance with the method and system of the present invention. Logical stack register address format 92 includes a least significant bits portion 96 which includes bits 2 through b, and a most significant bits portion 94 which includes bits b+1 through 31. The least significant bits portion 96 is stored in a mapping table 100. When addresses are compared, as described below, it is only the most significant bits portion 94 that is compared.

Figure 6:
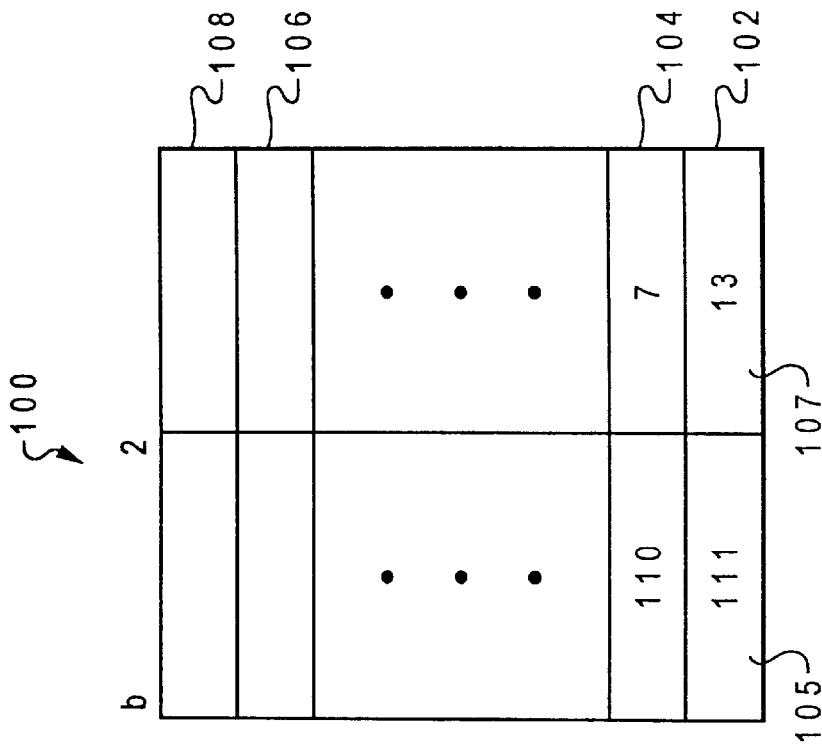
FIG. 6 illustrates a pictorial representation of a mapping table utilized to maintain a record of logical stack register addresses associated with physical registers in accordance with the method and system of the present invention.

FIG. 6 illustrates a pictorial representation of a mapping table utilized to maintain a record of logical stack register numbers associated with physical registers in accordance with the method and system of the present invention. Table 100 includes columns 105 and 107. Table 100 includes a plurality of entries, each entry including an element in each column 105 and 107. The data stored in column 105 includes least significant bits portion 96, which includes only bits b–2, of the stack register address, the implementation of the logical stack register number created by the programmer. The data stored in column 107 includes an identification of the physical register associated with each stack register. Therefore, for example, a "*PUSH 2, reg1" instruction is processed, two physical registers will be temporarily designated as stack registers. The stack pointer, or stack register, "reg1" will identify the logical address of the top of the stack. Table 100 will include the least significant portion of the logical storage address of each of the two stack registers to be designated. In addition, table 100 will also include an identification of each physical register temporarily designated as these two stack registers.

For example, for the first stack register, stack register 1, entry 102 includes a binary "111" in column 105 and an identifier for an associated physical register, such as physical register 13. Entry 104 includes, for the second stack register, a binary "110" in column 105 and an identifier for an associated physical register, such as physical register 7. In this manner, table 100 maintains the temporary designation of physical register 13 as stack register "reg1", and the temporary designation of physical register 7 as stack register "reg2".

For a particular instruction which includes a reference to a stack register, the special instruction register will include the stack register number in either field 56 or 76, the complete address including the bits from column 105 in either field 60 or 80, and the identification of the temporarily designated physical address of column 107 stored in either field 58 or 78. The virtual stack flag would be set in either field 54 or 74.

FIGS. 7–12 together depict a high level flow chart illustrating the temporary designation and utilization of a plurality of physical registers as a stack in accordance with the method and system of the present invention. The process starts as depicted at block 110 and thereafter passes to block 112 which illustrates the fetching of an instruction from cache. The instruction is loaded into the instruction register and decoded. Block 114 illustrates a determination of whether or not the instruction registers are full. If a determination is made that the instruction registers are not full, the process passes back to block 112. Referring again to block 114, if a determination is made that the instruction registers are full, the process passes to block 116 which depicts putting the instruction into a special instruction register (SIR), such as special instruction register 30, 32, 34, or 36. Next, the process passes to block 118 which illustrates getting an instruction from one of the special instruction registers.

Block 120, then, illustrates a determination of whether or not the instruction retrieved from the special instruction register is a *PUSH instruction. A *PUSH instruction is a new type of instruction which designates a particular number of registers which will be designated as stack registers. If a determination is made that the instruction is a *PUSH instruction, the process then passes to block 124. If a determination is made that the instruction is not a *PUSH instruction, the process then passes to block 122 which illustrates a determination of whether or not the instruction retrieved from the special instruction register is a *POP instruction. If a determination is made that the instruction is a *POP instruction, the process then passes to block 130. If a determination is made that the instruction is not a *POP instruction, the process then passes to block 136.

Referring again to block 124, block 124 illustrates a determination of the next free physical register. The next free physical register is determined utilizing a pointer which points to a pool of free physical registers. Next, block 126 depicts inserting the address of the next free physical register into column 107 of mapping table 100 for the associated stack register number. Thereafter, block 128 illustrates a determination of whether or not there are any more physical registers to be associated with the stack. If a determination is made that there are more physical registers to be associated with the stack, the process passes back to block 124. Referring again to block 128, if a determination is made that there are no more physical registers to be associated with the stack, the process passes back to block 114.

Referring again to block 130, block 130 depicts using the stack register associated with the *POP instruction to look up the associated physical register number in field 107 in mapping table 100. For example, a *POP instruction such as "*POP 2, reg1" would free the physical registers temporarily designated as stack registers 1 and 2. Next, block 132 illustrates freeing the physical register associated with the physical register number for reallocation. The freed physical register is returned to the pool of free physical registers. Thereafter, block 134 depicts a determination of whether or not there are any more physical registers to free. If a determination is made that there are additional physical registers to free, the process passes back to block 130. Referring again to block 134, if a determination is made that there are no more physical registers to free, the process passes back to block 114.

Referring again to block 136, block 136 illustrates a determination of whether or not the instruction is a LOAD STACK instruction. If a determination is made that the instruction is a LOAD STACK instruction, the process passes to block 138 which depicts the invalidation of all mapping table entries. Thereafter, the process passes back to block 114. Referring again to block 136, if a determination is made that the instruction is not a LOAD STACK instruction, the process passes to block 140 which depicts a determination of whether or not the instruction is a storage-type instruction. A storage-type instruction is one which includes a reference to a storage location. If the instruction is not a storage-type instruction, the process passes to block 156.

Referring again to block 140, if a determination is made that the instruction is a storage-type instruction, the process passes to block 142 which illustrates building a storage address and putting that built address into the storage address field of the special instruction register. The built storage address includes the base plus the displacement of the storage location. The process passes to block 144 which depicts a comparison of the stack register address with the storage address stored in either field 60 or 80 of the special instruction register. Thereafter, block 146 depicts a determination of whether the stack register address and the storage address are the same. The determination is completed utilizing bits 31 through (b+1). If a determination is made that the stack register address and the storage address are not the same, i.e. bits 31 through (b+1) are not the same, the process passes to block 156. Referring again to block 146, if a determination is made that the stack register address and the storage address are the same, i.e. bits 31 through (b+1) are the same, the process passes to block 148 which illustrates a determination of whether or not the mapping table is valid. If a determination is made that the mapping table is not valid, the process passes to block 156. Referring again to block 148, if a determination is made that the mapping table is valid, the process passes to block 150.

Block 150 depicts using the stack register number field of the special instruction register to select a particular entry in table 100. Table 100 is then read to determine the physical register which is temporarily designated as a particular stack register. Next, block 152 illustrates putting the physical register identifier stored in column 107 into either field 58 or 78 of the special instruction register. The process then passes to block 154 which depicts the setting of the "virtual stack" flag at the special instruction register. The process then passes to block 156.

Block 156 illustrates a determination of whether or not the "virtual flag" is set. If a determination is made that the "virtual flag" is set, the process passes to block 160 which depicts the execution units utilizing the physical register assigned field of the special instruction register to read or write as defined by the op code. Referring again to block 156, if a determination is made that the "virtual flag" is not set, the process passes to block 158 which illustrates the execution units utilizing the general registers or storage field to read or write and perform their defined function. The process then passes back to block 110.

While a preferred embodiment has been particularly shown and described, it will be understood by those skilled in the art that various changes in form and detail may be made therein without departing from the spirit and scope of the present invention.

We claim:

1. A method in a superscalar data processing system for the temporary designation and utilization of a plurality of physical registers as a stack, said data processing system including multiple instructions to be processed during a single clock cycle, said method comprising the steps of:

establishing said plurality of physical registers within said system, wherein none of said plurality of physical registers are designated as one of a plurality of general registers prior to said multiple instructions being allocated, and wherein none of said plurality of physical registers are initially designated as said stack prior to said multiple instructions being allocated;

for each of said multiple instructions, determining if said each of said multiple instructions is a stack allocation instruction, said stack allocation instruction including a variable quantity identifying the number of physical registers of said plurality of physical registers to be temporarily designated as said stack;

in response to one of said multiple instructions being said stack allocation instruction, selecting a first plurality of said plurality of physical registers available to be utilized as said stack, wherein the number of physical registers in said first plurality of said plurality of physical registers being the value of said variable quantity;

temporarily designating said first plurality of said plurality of physical registers as said stack, wherein said first plurality of said plurality of physical registers are utilized as said stack;

establishing a different special instruction register for each of said multiple instructions;

establishing a plurality of fields within said special instruction register, including a physical register field;

storing said each of multiple instructions in said different special instruction register;

for each of said multiple instructions being a stack allocation instruction, storing an indication of said temporarily designated one of said first plurality of said plurality of physical registers in said physical register field;

designating one of said plurality of fields within said special instruction register as a virtual stack field;

for each of said multiple instructions determining if said each of said multiple instructions is a second type of instruction, wherein said second type of instruction including a logical stack register number;

storing a first indicator in said virtual stack field within said special instruction register, in response to a determination that said each of said multiple instructions is said second type of instruction; and storing a second indicator in said virtual stack field within said special instruction register, in response to a determination that said each of said multiple instructions is not said second type of instruction.

2. The method according to claim 1 further comprising the step of associating a different logical stack register number with each of said first plurality of said plurality of physical registers.

3. The method according to claim 2 further comprising the steps of:

establishing a table for storing a plurality of entries; and each of said plurality of entries including an identification of a logical stack register number and an identification of one of said first plurality of said plurality of physical registers which is associated with said logical stack register number.

4. The method according claim 1 further comprising the steps of:

for each of said multiple instructions, determining if said each of said multiple instructions is a second type of instruction, wherein said second type of instruction having an associated one of said logical stack register numbers;

establishing a physical register field and a logical stack register field in said special instruction register;

in response to said each of said multiple instructions being a second type of instruction, storing said identification of said logical stack register number in said logical stack register field, and storing said identification of one of said first plurality of said plurality of physical registers which is associated with said logical register number in said physical register field.

5. The method according to claim 4, further comprising the step of utilizing said plurality of entries in said table to temporarily designate said first plurality of said plurality of physical registers as said stack.

6. The method according to claim 1 further comprising the steps of:

for each of said special instruction registers, determining a type of indicator stored in said virtual stack field;

in response to a determination that said first indicator is stored in said virtual stack field, utilizing said one of said first plurality of said plurality of physical registers during execution of said one of said multiple instructions stored in said special instruction register; and in response to a determination that said second indicator is stored in said virtual stack field, utilizing a storage location associated with said one of said multiple instructions during execution of said one of said multiple instructions stored in said special instruction register.

7. The method according to claim 6 further comprising the steps of:

for each of said multiple instructions, determining if said each of said multiple instructions is a stack de-allocation instruction, said stack de-allocation instruction including a variable quantity identifying the number of physical registers of said first plurality of said plurality of physical registers to release from said stack;

in response to one of said multiple instructions being said stack de-allocation instruction, selecting a second plurality of said plurality of physical registers which are temporarily designated as said stack, wherein the number of physical registers in said second plurality of said plurality of physical registers being the value of said variable quantity; and releasing said second plurality of said plurality of physical registers from said temporary designation as said stack, wherein said second plurality of said plurality of physical registers are available to be utilized for other processing.

8. A superscalar data processing system for the temporary designation and utilization of a plurality of physical registers as a stack, said data processing system including multiple instructions to be processed during a single clock cycle, comprising:

means for establishing said plurality of physical registers within said system, wherein none of said plurality of physical registers are designated as one of a plurality of general registers prior to said multiple instructions being allocated, and wherein none of said plurality of physical registers are initially designated as said stack prior to said multiple instructions being allocated;

means for determining for each of said multiple instructions, if said each of said multiple instructions is a stack allocation instruction, said stack allocation instruction including a variable quantity identifying the number of physical registers of said plurality of physical registers to be temporarily designated as said stack;

means, responsive to one of said multiple instructions being said stack allocation instruction, for selecting a first plurality of said plurality of physical registers available to be utilized as said stack, wherein the number of physical registers in said first plurality of said plurality of physical registers being the value of said variable quantity;

means for temporarily designating said first plurality of said plurality of physical registers as said stack, wherein said first plurality of said plurality of physical registers are utilized as said stack;

means for establishing a different special instruction register for storing each of said multiple instructions;

means for establishing a plurality of fields within said special instruction register, including a physical register field;

means for storing said each of multiple instructions in said different special instruction register;

means, responsive to a determination that said each of said multiple instructions being a stack allocation instruction, for storing an indication of said temporarily designated one of said first plurality of said plurality of physical registers in said physical register field;

means for designating one of said plurality of fields within said special instruction register as a virtual stack field;

means for determining, for each of said multiple instructions, if said each of said multiple instructions is a second type of instruction, wherein said second type of instruction including a logical stack register number;

means for storing a first indicator in said virtual stack field within said special instruction register, responsive to a determination that said each of said multiple instructions is said second type of instruction; and means for storing a second indicator in said virtual stack field within said special instruction register, responsive to a determination that said each of said multiple instructions is not said second type of instruction.

9. The system according to claim 8 further comprising means for associating a different logical stack register number with each of said first plurality of physical registers.

10. The system according to claim 9 further comprising:

means for establishing a table for storing a plurality of entries; and means for each of said plurality of entries including an identification of a logical stack register number and an identification of one of said first plurality of said plurality of physical registers which is associated with said logical stack register number.

11. The system according claim 10 further comprising:

means for each of said multiple instructions, for determining if said each of said multiple instructions is a second type of instruction, wherein said second type of instruction having an associated one of said logical stack register numbers;

means for establishing a physical register field and a logical stack register field in said special instruction register;

means responsive to said each of said multiple instructions being a second type of instruction, for storing said identification of said logical stack register number in said logical stack register field, and storing said identification of one of said first plurality of said plurality of physical registers which is associated with said logical register number in said physical register field.

12. The system according to claim 11, further comprising means for utilizing said plurality of entries in said table to temporarily designate said first plurality of said plurality of physical registers as said stack.

13. The system according to claim 8 further comprising:

means for each of said special instruction registers, for determining a type of indicator stored in said virtual stack field;

means responsive to a determination that said first indicator is stored in said virtual stack field, for utilizing said one of said first plurality of said plurality of physical registers during execution of said one of said multiple instructions stored in said special instruction register; and means responsive to a determination that said second indicator is stored in said virtual stack field, for utilizing a storage location associated with said one of said multiple instructions during execution of said one of said multiple instructions stored in said special instruction register.

14. The system according to claim 13 further comprising:

means for each of said multiple instructions, for determining if said each of said multiple instructions is a stack de-allocation instruction, said stack de-allocation instruction including a variable quantity identifying the number of physical registers of said first plurality of said plurality of physical registers to release from said stack;

means, responsive to one of said multiple instructions being said stack de-allocation instruction, for selecting a second plurality of said plurality of physical registers which are temporarily designated as said stack, wherein the number of physical registers in said second plurality of said plurality physical registers being the value of said variable quantity; and means for releasing said second plurality of said plurality of physical registers from said temporary designation as said stack, wherein said second plurality of said plurality of physical registers are available to be utilized for other processing.

* * * * *